Figure 1:
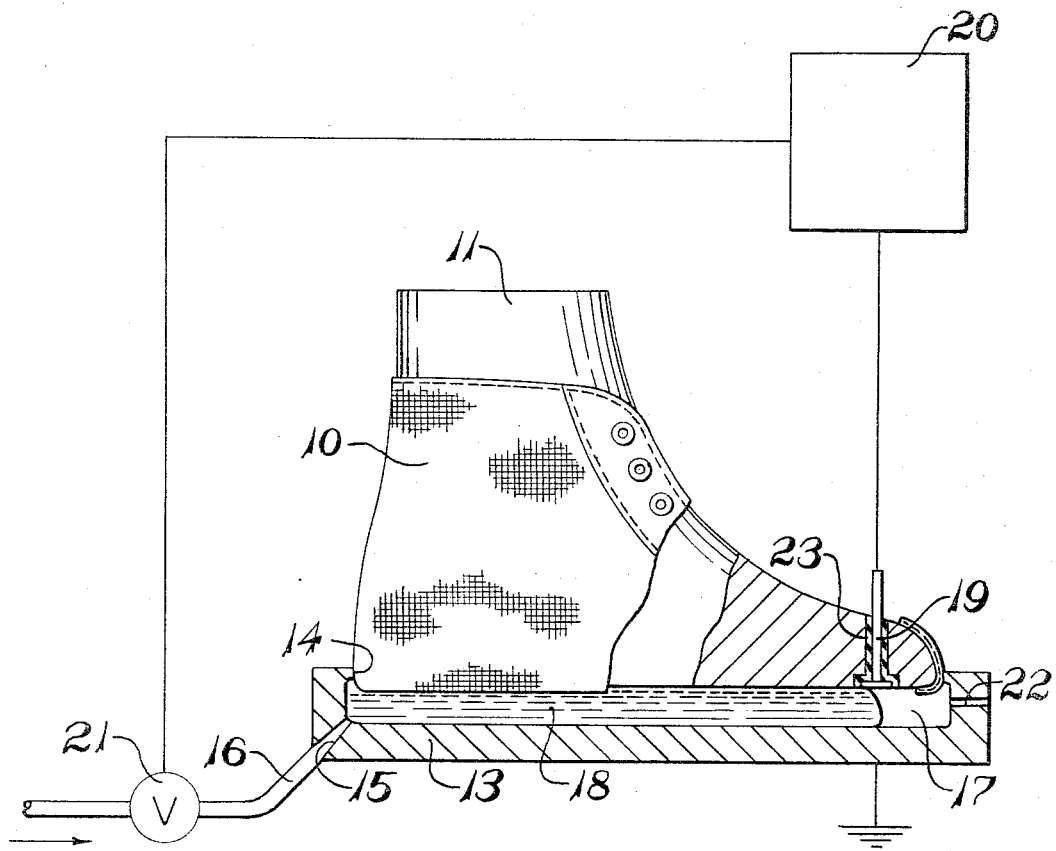

Feb. 28, 1967    R. J. MILLER, JR    3,306,964
METHOD OF INJECTION MOLDING AND APPARATUS THEREFOR
Filed Nov. 27, 1963

INVENTOR.
RICHARD J. MILLER JR,
BY James R. Lindsay
ATTY.

3,306,964
METHOD OF INJECTION MOLDING AND
APPARATUS THEREFOR
Richard J. Miller, Jr., Barrington, R.I., assignor to The
B. F. Goodrich Company, New York, N.Y., a corporation of New York
Filed Nov. 27, 1963, Ser. No. 326,484
4 Claims. (Cl. 264—244)

This invention relates to a method for making articles utilizing injection molding and pertains more particularly to a process for filling a preselected proportion of the mold cavity with a molding compound and to apparatus for carrying out the process.

A process for forming a sole onto a shoe upper that has received enthusiastic acceptance by footwear manufacturers involves the direct molding of a sole onto the shoe upper while the shoe upper is assembled on a last. In accordance with the process, the lasted upper is associated with an injection type mold that has a cavity corresponding in shape to the exterior surfaces of the sole desired to be formed on the shoe. The lasted shoe upper when properly assembled with the sole mold extends slightly into the mold cavity and fits snugly against the periphery of the cavity opening and thereby, in effect, forms a closure for the mold. The peripheral opening of the sole mold normally engages the shoe upper a slight distance up the side of the shoe upper and defines the extent up the side of the shoe upper to which the molded sole will extend. The lasted shoe upper, if necessary, is clamped or otherwise mechanically attached to the sole mold to prevent separation of the lasted shoe upper and sole mold during the molding operation. Flowable molding compound then is forced under pressure through a filling port located in the wall of the mold and into the mold cavity until the mold cavity is filled with molding compound. Because the volume of the mold cavity will vary with a different lasted uppers (since it is not possible for the lasters to position the shoe upper on the last in the exact same position each time and since there is some variance in the shoe upper constructions themselves and since it is humanly impossible to position the lasted upper in association with the sole mold in exactly the same way every time and since there may even be variances in the size of the mold cavity of the sole mold in different molds), it is not entirely desirable to employ the technique of introducing a predetermined quantity of molding composition into the mold cavity since the preselected quantity of molding compound may be too much or too little depending upon the actual volume of the mold cavity formed by a particular lasted shoe upper and sole mold assembly. Instead, because of the variances in the volume of the mold cavity to be filled, molding compound heretofore has been introduced into the cavity until molding compound exudes from a small overflow port located in the mold wall adjacent that part of the mold cavity which would be last to fill with the molding compound. When the operator filling the mold notices molding compound spewing from the overflow port, the operator realizes that the mold is filled and discontinues the injection of molding compound into the mold cavity. Subsequent to the filling, the molding composition is set (for example, by vulcanization if a vulcanizable rubber composition is used as the molding compound or by gelling and fusing if a vinyl chloride polymer composition is employed as the molding compound). The set molding composition generally is allowed to cool if heat has been utilized in the setting operation and then the lasted upper (with molded sole now molded to the shoe upper) is disengaged from the sole mold. The sprew from the filling port and the sprew from the overflow port are trimmed from the molded sole and any exterior finishing to be performed on the shoe is completed after which the shoe is stripped from the last and is provided with an insole member. The sole molded to an upper in this manner is bonded tenaciously to the upper, particularly if a fabric upper is being used. Mold releases may need to be applied to the bottom of the last if a midsole is not employed in the shoe construction and to the cavity surfaces of the sole mold to insure that the set molding composition will not adhere objectionably to these surfaces.

While the above-described process has met with considerable success there are certain difficulties which have been experienced in the use of the process. As indicated above, the molding compound is injected under pressure into the mold cavity formed between and by the sole mold and the lasted upper assembled therewith. For economic considerations, the pressure under which the molding compound is introduced onto the mold cavity is rather substantial since unless a sufficient injection pressure is used the time for filling the mold is objectionably long. The overflow port must be of sufficient size to allow the desired rate of filling of the mold to be realized, the overflow opening providing a means for air to escape from the mold cavity as the mold is filled, since if the overflow port is too small the air will not escape quickly enough and will cause a back pressure to form which interferes with the rapid filling of the mold. However, it also is desirable that the overflow port be as small as practical in order to minimize trimming and for appearance reasons. In commercial practice a fairly small overflow port is used, although its size is sufficient to permit the sole mold to be filled within an acceptably short time. The use of a high injection pressure for the molding compound coupled with the use of a fairly small overflow port results in an undesirably rapid build-up of the pressure of the molding compound within the mold at the moment when the mold becomes filled which objectionably high pressure continues to exist until the injection of molding compound into the mold cavity is discontinued and the presure within the cavity is relieved by the discharge of molding compound through the overflow port. The high pressure created frequently is sufficient to force molding compound between the periphery of the mold cavity and the shoe upper in contact therewith causing spoilage of the desired sharp line of demarcation at the upper sole edge.

Another difficulty which has been experienced involves the objectionable amount of molding compound which discharges from the overflow port and is wasted. Aside from the molding compound lost by discharge through the overflow port at the end of the filling of the mold but before the flow of molding compound into the mold is stopped, a considerable quantity of the molding compound normally is lost during the setting operation if heat is utilized in setting the molding composition. Molding compounds which are set through the application of heat expand when heated before they become set. Since the mold cavity is filled with the molding compound, the increased volume resulting from such expansion can be accommodated only by the discharge of molding compound through the overflow port. While the discharged material is not of great consequence when considering the amount of material lost in this manner during the manufacture of a single sole member, the quantity of lost molding compound does become material when a large number of soles are being formed by the described process.

The present invention overcomes the above-mentioned difficulties and provides a convenient and economical process for molding a sole from a heat-settable molding compound directly onto a shoe upper. In accordance with this invention a lasted shoe upper is assembled with a sole mold as previously was done in connection with the above-described process. However, the mold cavity is not completely filled with molding compound as has been done heretofore but, instead, is only partially filled. Specifically, the mold cavity is filled with the heat-settable molding compound until a preselected proportion of the mold cavity is filled with molding compound, the volume of the mold cavity remaining unfilled being almost but not quite equal to the volumetric increase in the molding compound realized when the molding compound is heated to set it. In order to fill only a preselected proportion of the mold cavity with molding compound, a sensing device with which the molding compound comes in contact after the mold cavity has been filled the predetermined proportion is used, the sensing device being instrumental in causing an electrical signal to be transmitted which signal closes a valve and stops the injection of molding compound into the mold cavity. Since the mold cavity initially is not completely filled with molding composition, there is no rapid build-up of pressure within the mold cavity as is occasioned when filling the mold cavity completely. As a result, the difficulty heretofore experienced of molding compound being extruded between the peripheral opening of the mold cavity and the shoe upper normally in contact therewith is eliminated. Also, since the increase in the volume of the molding compound occasioned by heating the molding compound to set it is taken into consideration in determining the degree to which the mold cavity is filled, an objectionable amount of molding compound is not lost as a result of the discharge of excessive molding compound through the overflow port.

It will be apparent that the process of this invention is not the same as that involving injecting a predetermined volume of molding compound into the mold cavity. As explained above, the volume of the mold cavity to be filled with molding composition is not the same in all instances. The injection of the same predetermined quantity of molding compound into the mold cavity in each instance does not take into consideration the possible variance in the volume of the mold cavity which will be encountered. As a result, when a procedure involving injecting a predetermined quantity of the molding compound into the mold cavity is used, the mold cavity in some instances will be incompletely filled even when the molding compound is in its fully expanded condition (i.e., when the molding compound is heated to set it) whereas in other instances an excessive quantity of molding compound will be injected into the mold cavity causing an objectionably large discharge and waste of molding compound from the overflow port. However, the present invention which involves filling only a selected volume proportion of the mold cavity with molding compound automatically compensates for variances in the volume of the mold cavity. Therefore, if the volume of the mold cavity increases the amount of molding compound injected into the mold cavity automatically is increased and if the volume of the mold cavity is reduced the volume of molding compound automatically is decreased.

Figure 2:
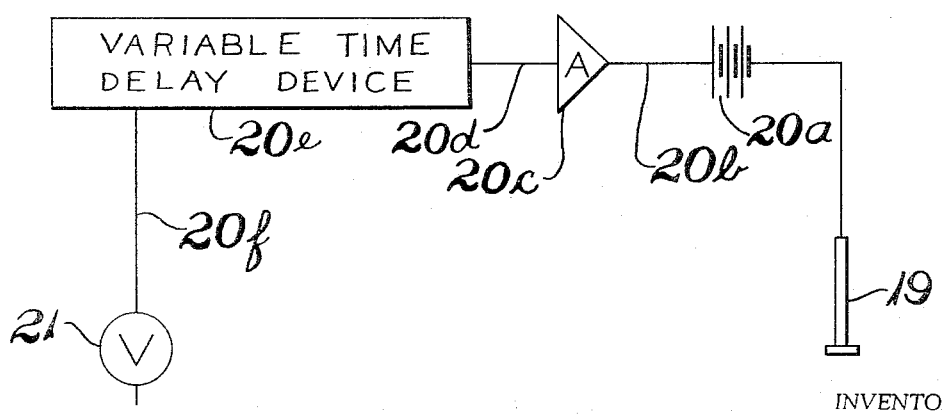

The invention will be more fully understood by referring to the following specific illustration of an embodiment of the invention and by referring to the drawing in which FIG. 1 is a side elevation, partly broken away and in section, of an embodiment of the present invention showing a lasted shoe upper in assembly with a sole mold and showing the mold cavity partially filled with molding compound; and FIG. 2 is a schematic diagram of a control circuit for the system shown in FIG. 1.

Referring to the drawing, a shoe upper 10 is lasted onto a last 11 in the customary manner, the shoe upper being retained on the last usually either by slip lasting or by string lasting the shoe upper in position on the last, and the lasted shoe upper is inserted into the cavity opening of the sole mold 13. The cavity opening of the sole mold 13 is of a size and shape that the peripheral edge 14 of the cavity opening along its entire extent bears firmly against shoe upper 10 when the lasted shoe upper is inserted therein to produce a seal which prevents the leakage of molding compound through this juncture of the shoe upper 10 and sole mold 13 under normal operating conditions. It will be noticed that the peripheral edge 14 of the cavity opening of the sole mold 13 preferably engages the shoe upper 10 a slight distance up the side of the shoe upper and defines the upper edge of the shoe sole molded onto the shoe upper 10. The molding of the shoe sole so that it extends a slight distance up the side of the shoe upper 10 enhances the appearance of the finished shoe and produces a more tenacious bond between the sole and the shoe upper than otherwise would be obtained. It also should be observed that the lasted shoe upper when inserted in position in the cavity opening of the mold 13 in effect functions as a closure for the sole mold and defines with the bottom face and side edges of the mold cavity the space to be filled with molding compound and the actual shape of the sole to be formed therein. If it is felt that the lasted shoe upper might become unseated from its proper assembly with the sole mold when molding compound is injected into the mold cavity, the lasted shoe upper can be clamped or otherwise mechanically secured to mold 13 to insure that the lasted shoe upper will be held in proper association with the sole mold.

The sole mold 13 is provided with a suitable filling port 15 into which an injection nozzle 16 can be inserted and through which molding compound can be injected into the mold cavity 17. As depicted in the drawing, molding compound 18 nearly fills mold cavity 17.

In the embodiment of this invention herein shown and described an electrical conductive sensing element 19 is located in last 11 in a position remote from the filling port 15 and exposed to the mold cavity into which the molding compound is introduced. The sensing element 19 is electrically connected to an electrical signal generator 20 which in turn is electrically connected to an electrically operated valve 21 which can be opened or closed by a rather weak electrical signal. Upon the injection of molding compound 18 through filling port 15 into the mold cavity 17, the molding compound 18 fills the mold cavity adjacent the filling port 15 first and as more and more molding compound is injected into the mold cavity the mold cavity is filled in a progressive manner. When the molding compound 18 has progressed sufficiently to contact the sensing element 19 a closed electrical circuit is formed, molding compound 18 having at least some electrical conductivity. The completion of the electrical circuit causes an electrical signal to be transmitted and amplified from the signal generator 20 to valve 21 which electrical signal causes the closing of valve 21 thereby stopping the injection of molding compound into the mold cavity 17. The sensing element 19 is sufficiently removed from the filling port 15 that the mold cavity 17 is substantially filled with molding compound before molding compound contacts the sensing element 19 and completes the electrical circuit which in turn causes the closure of valve 21.

The positioning of the sensing element 19 depends somewhat on the expansion characteristics of the molding compound intended to be used. It should be remembered that it is desired to stop the injection of molding compound into the mold cavity when the unfilled volume of the mold cavity equals slightly less than the actual volume increase of the molding compound when it is heated to set it, or, phrasing it conversely, until the actual volume expansion of the molding compound which has been injected into the mold cavity when heated to the temperature at which it will set is slightly greater than the volume of the unfilled portion of the mold cavity. The sensing element 19 must be positioned, therefore, so that the molding compound 18 contacts the sensing element 19 before the mold cavity is filled to a point that upon thermal expansion of the molding compound (when the molding compound is heated to set it) an objectionable amount of the molding compound is discharged from the overflow port 22 which is provided in the wall of the mold, preferably at the most distal region from the filling port 15. To illustrate, when a volume expansion of 6% is observed when a particular molding compound is heated to the temperature at which setting takes place, the injection of molding compound into the mold cavity desirably is continued until 95 to 96% by volume of the mold cavity is filled with the molding compound. In accordance with this illustration, the molding compound preferably should contact the sensing element 19 when the volume of the mold cavity is 95 to 96% filled with molding compound. A very slight excess (less than 1%) of molding compound is lost through discharge through the overflow port in the stated example when the molding compound is heated to the desired temperature for setting the compound.

However, it will be realized that the placement of the sensing element 19 in the exact position for optimum operation is difficult to achieve. Therefore, the signal generator 20 also is provided with a time delay device to allow a delay in time between the time the molding compound 18 contacts the sensing device 19 and the time a signal to close valve 21 is sent from the signal generator 20 to the electrically-operated valve 21. The time delay device is adjustable so that different periods of time delay can be selected. It will be understood that the time delay device introduced into the signal circuit allows for some measure of adjustment in the amount of molding compound which will be injected into the mold cavity. Thus, if the sensing device 19 is so positioned that it is contacted by molding compound thereby completing the electrical circuit before the mold cavity is filled as completely as desired, instead of this contact of the molding compound 18 with the sensing device immediately sending out a signal from signal generator 20 that would close the valve 21 and stop the injection of molding compound into the mold cavity a selected delay in time before the signal generator 20 transmits the signal to the valve 21 can be set on the time delay device. The signal transmitted by the signal generator 20, it will be understood, will be delayed the set increment of time allowing the mold cavity to be filled more fully.

FIG. 2 illustrates schematically a control circuit which can be employed in the above-described embodiment of this invention. In the circuit illustrated, the source of electrical energy is derived from battery 20a which energy is transmitted through line 20b once the molding compound 18 has contacted sensing device 19 to an amplifier 20c. The amplified electrical signal then is transmitted through line 20d to an adjustable time delay device 20e (such as a timer cam switch device) that allows a delay in time between the time the molding compound 18 contacts the sensing device 19 and the time the electrical signal to close valve 21 is sent through line 20f to the electrical-operated valve 21.

Sensing device 19 is encased in an electrical insulator 23 to insulate the sensing device from the last 11, and the mold 13 is grounded in order to provide the proper electrical circuit. The sensing element 19 may be formed of any electrical conductive material, such as steel, copper or aluminum. While in the embodiment of the invention shown in the drawing the sensing element is housed within the shoe last 11, it will be appreciated that the sensing device 19 can be confined just as effectively within the wall of the mold 13 provided that the sensing device 19 is insulated from the mold 13. Actually, in certain instances, for example when a midsole is employed and is disposed over the bottom face (the sole) of the last, it is more convenient to have the sensing device housed in the mold wall rather than in the shoe last since otherwise an opening would need to be made in the midsole so as to expose the sensing device to the mold cavity.

After the mold cavity is partially filled in accordance with this invention, the molding of the sole is completed by heating the molding compound to a temperature sufficient and for a time sufficient to set the molding compound. The temperature to which the molding compound must be heated to set the molding compound and the length of time that the molding compound should be held at a setting temperature in order to effectively set the molding composition will vary of course with the particular molding compound being used. As heat is applied to the molding compound and before it sets, the molding compound expands filling the mold cavity completely with molding compound. After the molding compound has been set, it is allowed to cool and, thereafter, the lasted shoe upper with the sole molded thereon is removed from the mold and any exterior finishing operations are performed while the shoe is still on the last. The shoe then is stripped from the last and is provided with an insole which is cemented into place.

Any molding compound which requires heat to set the composition and which will flow under moderate pressure may be injection molded by the process of the present invention. For example, a milled vulcanizable rubber composition can be used. However, a vinyl chloride polymer plastisol composition is particularly suitable for use in the process of this invention. A vinyl chloride polymer plastisol is a dispersion of vinyl chloride polymer in a liquid plasticizer for the vinyl chloride polymer and may include such additives as colorants, stabilizers, fillers and other modifying agents. Plastisols normally contain at least 35 parts by weight of the liquid plasticizer for every 100 parts by weight of the vinyl chloride polymer, and frequently comprise as much as 300 to 400 or more parts by weight of the liquid plasticizer for every 100 parts by weight of the vinyl chloride polymer. Dioctyl phthalate, butyl decyl phthalate, dioctyl adipate, dioctyl sebacate, tricresyl phosphate, trioctyl phosphate, didecyl phthalate, and acetyl tributyl citrate are typical illustrations of liquid plasticizers useful in forming plastisols. The most commonly used plastisols contain in dispersed form polyvinyl chloride (a homopolymer of vinyl chloride) and/or copolymers of vinyl chloride with vinyl acetate, vinylidene chloride or maleic acid esters as the vinyl chloride polymer constituent of the plastisol.

It will be appreciated that, if needed, the surfaces of the mold cavity and any exposed surfaces of the shoe last can be coated with a suitable mold release material so that the set molding compound does not adhere objectionably to these surfaces.

While the description of the present invention has been directed to the molding of a sole onto a shoe upper, it will be understood that the process of this invention is not limited thereto but may be used in connection with any closed mold filled by the injection of a molding compound to be set by heat into the mold cavity.

I claim:

1. A method for molding a sole onto a shoe upper which comprises lasting a shoe upper onto a shoe last, inserting the lasted shoe upper into the cavity opening of a sole mold until the peripheral edge of the cavity opening of the sole mold along its entire extent engages the shoe upper a slight distance up the side of the shoe upper whereby the lasted shoe upper provides a closure for said sole mold and with said sole mold produces a mold cavity having the general shape of the sole desired to be molded onto said shoe upper, injecting a heat-settable flowable molding composition into the mold cavity formed between and by said sole mold and said lasted shoe upper, discontinuing the injection of the molding composition into the said mold cavity when a preselected proportion of the mold cavity has been filled with the molding composition by transmission of an electrical signal to an electrically-operated valve to close the said valve and thereby prevent the further injection of molding composition into the mold cavity, the transmission of said electrical signal having resulted because of the contact of said molding composition injected into the said mold cavity with an electrical-conductive sensing element housed in one of the said components which define the closed mold cavity having the general shape of the sole desired to be molded onto said shoe upper, said sensing element being electrically-insulated from said component in which it is housed and being exposed within the mold cavity which contact of the molding composition with the said sensing element completes an electrical circuit in which said electrically-operated valve is included and in which means for generating the said electrical signal is included, the unfilled portion of the mold cavity being slightly less in volume than the increase in volume resulting from thermal expansion of the molding composition in the mold cavity when it is heated to set it, and heating the molding composition in said mold cavity to a temperature and for a time sufficient to thermally expand and set the molding composition.

2. A method for molding a sole onto a shoe upper which comprises lasting a shoe upper onto a shoe last, inserting the lasted shoe upper into the cavity opening of a sole mold until the peripheral edge of the cavity opening of the sole mold along its entire extent engages the shoe upper a slight distance up the side of the shoe upper whereby the lasted shoe upper provides a closure for said sole mold and with said sole mold produces a mold cavity having the general shape of the sole desired to be molded onto said shoe upper, injecting a vinyl chloride polymer plastisol composition into the mold cavity formed between and by said sole mold and said lasted shoe upper, discontinuing the injection of the plastisol composition into the said mold cavity when a preselected proportion of the mold cavity has been filled with the plastisol composition by transmission of an electrical signal to an electrically-operated valve to close the said valve and thereby prevent the further injection of plastisol composition into the mold cavity, the transmission of said electrical signal having resulted because of the contact of the plastisol composition injected into the said mold cavity with an electrical-conductive sensing element contained in said shoe last and insulated therefrom and exposed within the mold cavity which contact of the plastisol composition with the said sensing element completes an electrical circuit in which said electrically-operated valve is included and in which means for generating the said electrical signal is included, the unfilled portion of the mold cavity being slightly less in volume than the increase in volume resulting from thermal expansion of the plastisol composition in the mold cavity when it is heated to gel and fuse the plastisol, heating the plastisol composition injected into said mold cavity to a temperature and for a time sufficient to thermally expand and fuse the plastisol composition in the mold cavity, cooling the fused plastisol composition, and disengaging the lasted shoe upper with the molded sole attached thereto from the sole mold.

3. Injection molding apparatus for molding a sole onto a shoe upper which comprises a sole mold having a lasted shoe upper inserted into the cavity opening thereof with the peripheral edge of the cavity opening of the sole mold engaging along its entire extent the shoe upper a slight distance up the side of the shoe upper whereby the lasted shoe upper provides a closure for said sole mold and with said sole mold produces a mold cavity having the general shape of the sole desired to be molded onto the shoe upper, said sole mold having an injection port through the wall thereof through which heat-settable flowable molding composition can be injected under pressure into said mold cavity formed between and by said lasted shoe upper and said sole mold, said sole mold having an overflow port through the wall thereof opening into the said mold cavity in the region most distal from said injection port which overflow port provides an opening through which excess molding composition can discharge from the said mold cavity, an electrical-conductive sensing element housed within the said shoe last and exposed within the said mold cavity, said sensing element being positioned with respect to the location of said injection port so as to be contacted by the molding composition when a predetermined proportion of the said mold cavity is filled with the molding composition, said sensing element being electrically-insulated from said shoe last, said sensing element being in electrical connection with an electrical signal generator, said electrical signal generator being in electrical connection with an electrically-operated valve which when closed discontinues the injection of molding composition into the said mold cavity, the contact of molding composition injected into the said mold cavity with said sensing element when said mold cavity is filled to the predetermined proportion causing an electrical connection to be formed between said sensing element and said valve and causing an electrical signal to be transmitted by said electrical signal generator to said valve which signal closes said valve and terminates the flow of molding composition in to the said mold cavity.

4. Injection molding apparatus for molding a sole onto a shoe upper which comprises a sole mold having a lasted shoe upper inserted into the cavity opening thereof with the peripheral edge of the cavity opening of the sole mold engaging along its entire extent the shoe upper a slight distance up the side of the shoe upper whereby the lasted shoe upper provides a closure for said sole mold and with said sole mold produces a mold cavity having the general shape of the sole desired to be molded onto the shoe upper, said sole mold having an injection port through the wall thereof through which heat-settable flowable molding composition can be injected under pressure into said mold cavity formed between and by said lasted shoe upper and said sole mold, said sole mold having an overflow port through the wall thereof opening into the said mold cavity in the region most distal from said injection port which overflow port provides an opening through which excess molding composition can discharge from the said mold cavity, an electrical-conductive sensing element housed within the said shoe last and exposed within the said mold cavity, said sensing element being positioned with respect to the location of said injection port so as to be contacted by the molding composition when a predetermined proportion of the said mold cavity is filled with the molding composition, said sensing element being electrically-insulated from said shoe last, said sensing element being in electrical connection with an electrical signal generator, said electrical signal generator being in electrical connection with an electrically-operated valve which when closed discontinues the injection of molding composition into the said mold cavity, the contact of molding composition injected into the said mold cavity with said sensing element when said mold cavity is filled to the predetermined proportion causing an electrical connection to be formed between said sensing element and said valve and causing an electrical signal to be generated in said electrical signal generator, said electrical signal generator comprising adjustable time delay means for delaying the transmission of the said electrical signal from said electrical signal generator to said valve for the period of time for which the said time delay means is set whereby the injection of molding composition into the mold cavity continues for the period of time during which the said time delay means delays the transmission of the said electrical signal generated in said electrical signal generator as a result of the contact of the molding composition within said mold cavity with the said sensing element after which period of time the said electrical signal is transmitted to said valve causing said valve to be closed thereby terminating the flow of molding composition into the said mold cavity.

References Cited by the Examiner

UNITED STATES PATENTS

| | | | |
|---|---|---|---|
| 3,019,764 | 2/1962 | Schilling | 200—152.4 XR |
| 3,051,995 | 9/1962 | Ferrell et al. | 264—244 XR |
| 3,175,249 | 3/1965 | Ferreira | 264—244 XR |

ROBERT F. WHITE, *Primary Examiner.*

T. J. CARVIS, *Assistant Examiner.*